(12) United States Patent
Bystroem

(10) Patent No.: US 11,919,641 B2
(45) Date of Patent: Mar. 5, 2024

(54) PAYLOAD LAUNCHING ARRANGEMENT AND A METHOD FOR LAUNCHING A PAYLOAD

(71) Applicant: SAAB AB, Linkoeping (SE)

(72) Inventor: Gunnar Bystroem, Kungsaengen (SE)

(73) Assignee: SAAB AB, Linköping (SE)

( * ) Notice: Subject to any disclaimer, the term of this patent is extended or adjusted under 35 U.S.C. 154(b) by 536 days.

(21) Appl. No.: 17/257,949

(22) PCT Filed: Aug. 14, 2018

(86) PCT No.: PCT/SE2018/050822
§ 371 (c)(1),
(2) Date: Jan. 5, 2021

(87) PCT Pub. No.: WO2020/036518
PCT Pub. Date: Feb. 20, 2020

(65) Prior Publication Data
US 2021/0261254 A1    Aug. 26, 2021

(51) Int. Cl.
*B64D 1/02*    (2006.01)
(52) U.S. Cl.
CPC ...................... *B64D 1/02* (2013.01)
(58) Field of Classification Search
CPC ........................................................ B64D 1/02
See application file for complete search history.

(56) References Cited

U.S. PATENT DOCUMENTS

| | | |
|---|---|---|
| 2,791,387 A | 5/1957 | Weinberg |
| 3,511,457 A * | 5/1970 | Pogue ...................... B64D 1/02 89/1.51 |
| 3,547,000 A | 12/1970 | Haberkorn et al. |
| 4,522,104 A | 6/1985 | Degen |
| 4,858,850 A | 8/1989 | Mcnay |

(Continued)

FOREIGN PATENT DOCUMENTS

| | | |
|---|---|---|
| EP | 0511946 A1 | 11/1992 |
| WO | WO 2010/123423 A1 | 10/2010 |
| WO | WO 2010/144008 A1 | 12/2010 |

OTHER PUBLICATIONS

International Searching Authority (ISA), International Search Report and Written Opinion for International Application No. PCT/SE2018/050822; dated Apr. 8, 2019, 12 pages, Swedish Patent and Registration Office.

(Continued)

*Primary Examiner* — Justin M Benedik
(74) *Attorney, Agent, or Firm* — Alston & Bird LLP

(57) ABSTRACT

The present invention concerns a method for launching a payload (3) by means of an arrangement (1), which is configured for storing and launching a payload (3). A launch compartment (5) of the arrangement (1) is configured to eject the payload (3) from the launch compartment (5) via a push-out chamber (7) to an airflow (AF), which during use of the arrangement (1) flows over an aerodynamic surface (9) of the arrangement (1). An air intake (13) is formed in the aerodynamic surface (9) and is coupled to the push-out chamber (7) and/or launch compartment (5) via an internal air transfer arrangement (17) comprising an openable closure member (11) configured to close and open the internal air transfer arrangement (17).

11 Claims, 3 Drawing Sheets

(56) References Cited

U.S. PATENT DOCUMENTS

| | | |
|---|---|---|
| 6,050,527 A | 4/2000 | Hebert et al. |
| 2012/0012605 A1 | 1/2012 | Melin et al. |
| 2016/0121996 A1 | 5/2016 | Eveker et al. |

OTHER PUBLICATIONS

International Preliminary Examining Authority, International Preliminary Report on Patentability Chapter II, including Applicant's Apr. 20, 2020 Response to the ISA's Apr. 8, 2019 Written Opinion, for International Application No. PCT/SE2018/050822, dated Apr. 23, 2020, 15 pages, Swedish Patent and Registration Office.

European Patent Office, Extended European Search Report received for Application No. 18930469.4, dated Feb. 18, 2022, 7 pages, Germany.

Saab AB, Response to European Patent Office Mar. 9, 2022 Communication received for Application No. 18930469.4, dated Aug. 30, 2022, 5 pages, Germany.

European Patent Office, Intent to Grant received for Application No. 18930469.4, dated Jul. 11, 2023, 28 pages, Germany.

\* cited by examiner

PAYLOAD LAUNCHING ARRANGEMENT AND A METHOD FOR LAUNCHING A PAYLOAD

CROSS REFERENCE TO RELATED APPLICATIONS

This application is a National Stage Application, filed under 35 U.S.C. § 371, of International Application No. PCT/SE2018/050822, filed Aug. 14, 2018; the contents of which are hereby incorporated by reference in its entirety.

BACKGROUND

Related Field

The present invention relates to an arrangement configured for storing and launching a payload.

The present invention especially relates to an arrangement for launching countermeasures from aerial vehicles to deter and defeat threats.

The present invention may concern the industry manufacturing arrangements configured to store and launch payloads from aerial vehicles, but is not limited to such.

Description of Related Art

Side-ways eject arrangements of today configured for storing and launching payload suffer from not being capable to launch the payload in a secure way, wherein the payload might get jammed in the launch opening.

One problem with current side-ways eject arrangements may be that payloads configured to be openable for realising countermeasure means might not start a backward backflip when launched.

One problem with side-ways eject arrangements of today is that they provide a poor bloom rate, i.e. poor spread out of countermeasure means, whereas they suffer from poor launch efficiency and slow sideway ejection of the payload.

BRIEF SUMMARY

There is an object to provide an arrangement configured for storing and launching a payload, wherein the payload to be launched is ejected in such way that efficient sideway launch can be performed without any risk for jammed payload in the launch opening.

One object is to provide an arrangement configured for storing and launching a payload configured for aerial vehicles and countermeasure protection of the aerial vehicle by sideway ejection of payload.

One object is to overcome problems with prior art sideways eject arrangements configured for storing and launching payloads.

This has been solved by an arrangement configured for storing and launching a payload, a launch compartment of the arrangement is configured to eject the payload from the launch compartment via a push-out chamber to an airflow, which during use of the arrangement flows over an aerodynamic surface of the arrangement, wherein an air intake is formed in the aerodynamic surface and is coupled to the push-out chamber and/or launch compartment via an internal air transfer arrangement comprising an openable closure member configured to close and open the internal air transfer arrangement.

Alternatively, the openable closure member comprises an openable hatch member that is arranged to the aerodynamic surface.

Alternatively, the openable closure member comprises an openable hatch member is formed in the aerodynamic surface or may be configured to cover the air intake.

Alternatively, the air intake and/or the openable closure member being configured to, in an open state and during use of the arrangement, lead a separated flow of air divided from the airflow into the push-out chamber and/or the launch compartment via the internal air transfer arrangement.

Alternatively, the internal air transfer arrangement comprises an air channel configured to lead the separated flow of air to the push-out chamber and/or launch compartment.

Alternatively, the air intake and/or the openable closure member being configured to form a low-drag air inlet.

Alternatively, the openable closure member is configured to be openable in a variable manner for affecting the payload with a proper additional push-out force depending upon the attitude and the velocity of the aerial vehicle.

Alternatively, the air intake is configured to allow a separated flow of air into the push-out chamber via an internal duct arrangement provided between the air intake and the push-out chamber.

Alternatively, the internal air transfer arrangement is configured to direct a separated flow of air in a direction opposite or nearly opposite the direction of the airflow and/or in a direction inclines obliquely downwards and forwards relative to the flight direction.

Alternatively, the flight direction is opposite the direction of the airflow or nearly opposite the direction of the airflow.

In such way is achieved that the payload will be affected by an additional push-out force.

Alternatively, by a pre-determined direction of the flow of air leaving the air transfer arrangement via the push-out chamber and/or the launch compartment, there is achieved complementary rotational motion of the payload during ejection.

Alternatively, a sliding portion of the payload is configured, during launching, to be able to slide along a guideway extending within the push-out chamber from the launch compartment to a launch opening formed in the aerodynamic surface.

Alternatively, the extension of the guideway extends a distance outward from and beyond the aerodynamic surface by means of a protruding ramp.

Alternatively, the extension of the guideway inclines with an acute angle relative the normal to the centre line of the arrangement.

Alternatively, the acute angle is between 10° to 60°, preferably between 20° and 45°.

Alternatively, the acute angle is determined in such a way that, during use of the arrangement, airflow flowing over the aerodynamic surface will apply an additional force on a first portion of the payload being ejected, so that the payload will flip around for releasing a countermeasure element by means of the airflow.

Alternatively, there is provided an aerial vehicle configured to carry the arrangement.

This has been solved by a method for launching a payload by means of an arrangement configured to eject the payload from a launch compartment via a push-out chamber to an airflow, which during use of the arrangement flows over an aerodynamic surface of the arrangement, wherein an air intake is formed in the aerodynamic surface and is coupled to the push-out chamber and/or launch compartment via an internal air transfer arrangement comprising an openable closure member configured to close and open the internal air transfer arrangement, the method comprises the steps of; loading the launch compartment with the payload to be launched: opening the openable closure member for dividing a separated flow of air from the airflow and leading the separated flow of air into the push-out chamber and/or launch compartment from the air intake; ejecting at least one payload from the launch compartment; and closing the openable hatch member.

Alternatively, the air intake is connected (e.g. coupled to the push-out chamber and/or launch compartment and configured to transfer flow of air) to the push-out chamber and/or launch compartment via an internal air transfer arrangement.

Alternatively, the method comprises the further step of; leading the separated flow of air into the push-out chamber and/or launch compartment in such way that the separated flow of air is directed in a direction opposite or nearly opposite the direction of the airflow and/or is directed in a direction that inclines obliquely downwards and forwards relative to the flight direction.

Alternatively, the air intake and/or the openable closure member comprising a cowling arrangement for proving low drag performance of the air intake and/or the openable hatch member.

Alternatively, the air intake being formed as a submerged air inlet comprising curved walls recessed into the aerodynamic surface.

Alternatively, the air intake being formed as a flush air inlet.

Alternatively, a launch opening is provided in the aerodynamic surface, which launch opening is coupled or associated with the launch compartment via the push-out chamber for providing an open connection between the launch compartment and the airflow.

Alternatively, the push-out chamber comprises a guideway configured to guide the payload upon ejection from the launch compartment.

Alternatively, the launch compartment comprises an ejection device configured to eject the payload with a push-out force.

Alternatively, the openable hatch member is configured to fully or partly cover an air intake.

Alternatively, the push-out chamber is open towards the launch compartment and towards the air intake.

Alternatively, the push-out chamber is open towards the launch compartment and towards the air intake.

In such way is achieved that, when the arrangement is moved through the air in a flight direction and the air flows over the aerodynamic surface as an airflow, the flow of air flowing into the launch compartment will affect the payload being ejected with an additional push-out force.

In such way the eject force of the ejection device can be added with an additional push-out force.

In such way is provided that a rapid sideway ejection of the payload can be achieved.

Alternatively, the launch compartment is coupled to a payload storage compartment for transfer of payloads from the payload storage compartment to the launch compartment.

Alternatively, the launch compartment and/or a payload storage compartment and/or the push-out chamber being encompassed in a body of the arrangement.

Alternatively, the body is an elongated body comprising a fore end facing the flight direction during use of the arrangement and an aft end facing a direction opposite the flight direction.

Alternatively, the air intake and/or the openable hatch member being designed to allow separated flow of air into the push-out chamber and/or launch compartment via an internal duct arranged in the body of the arrangement between the air intake (or the openable hatch member) and the push-out chamber (or launch compartment).

Alternatively, a direction pointing from the fore end to the aft end fully or essentially corresponds with the direction of the airflow flowing over the aerodynamic surface.

Alternatively, the gradient of the direction of an airflow flowing over the aerodynamic surface, during use of the arrangement, with respect to an imaginary inclining line parallel with the guideway exhibits an obtuse angle defined externally the launch opening in a direction toward a fore end of the arrangement and seen in a direction outward from the aerodynamic surface.

Alternatively, the ejection device is configured to eject the payload along the guideway.

Alternatively, the launch compartment is configured to store at least one payload.

Alternatively, the launch compartment constitutes a payload storage compartment, entirely or at least partly.

Alternatively, the guideway extends from the launch compartment to the launch opening via the push-out chamber and may entirely be inclined relative the flight direction or partly inclined.

Alternatively, the guideway inclines obliquely downwards and backwards relative to the flight direction.

In such way, by means of the combined inclined guideway, ejection device, the separated flow of air divided from the airflow and led into the push-out chamber, there is achieved an efficient launch of payloads from the body of the arrangement.

In such way the ejected payload will be affected by an additional force generated by the airflow providing that a rapid sideway ejection of the payload is achieved.

Alternatively, the body exhibits a fore end and an aft end seen in a direction along the flight direction.

Alternatively, the body is an elongated body extending in the flight direction when being used.

Alternatively, during use of the arrangement, a first direction pointing from the aft end to the fore end fully or essentially corresponds with the flight direction of an aerial vehicle coupled to the arrangement.

Alternatively, during use of the arrangement, a second direction pointing from the fore end to the aft end fully or essentially corresponds with the direction of an airflow flowing over the aerodynamic surface.

Alternatively, the sliding portion of the payload is formed flat, or essentially flat.

The centre line is defined as a line that runs along the prolongation of the elongated body and between the fore end and the aft end.

In such way arrangement can be efficiently used by an aerial vehicle also flying with a high angle of attack and flying slow.

In such a way is achieved that the payload will leave the elongated body (the major part of the elongated body) further away from the aerodynamic surface implying that the payload is ejected further sideways.

In such way is achieved an increased bloom rate when ejecting a plurality of payloads from the elongated body.

Alternatively, the arrangement is carried by an aerial vehicle configured to carry the arrangement.

Alternatively, the arrangement is configured to launch the payload sideways from the aerial vehicle.

Alternatively, the arrangement comprises one or a plurality of payloads.

Alternatively, the arrangement may comprise a plurality of payloads, each configured to be ejected from the compartment.

Alternatively, the payload may comprise a countermeasure means, which is releasable, arranged to the payload and released for confusing e.g. radar-guided or infrared guided anti-aircraft missiles.

Alternatively, the payload may constitute the countermeasure means per se.

Alternatively, the countermeasure means may comprise flares, chaff, infrared countermeasures, or other countermeasure.

Due to the inclination and interaction with the airflow, the payload is affected by an additional eject force pushing the payload out from the launch opening.

In such way is achieved that the performance of the ejection device configured to eject the payload along the guideway can be enhanced, wherein the payload can be launched even more a further distance sideways from the aerial vehicle.

The aerial vehicle may be a commercial aircraft or a military aircraft.

The arrangement configured for storing and launching a payload may be called "side-ways eject arrangement".

BRIEF DESCRIPTION OF THE DRAWINGS

The present disclosure herein will now be described by way of examples with references to the accompanying schematic drawings, of which.

DETAILED DESCRIPTION OF VARIOUS EMBODIMENTS

Hereinafter, examples of the present invention will be described in detail with reference to the accompanying drawings, wherein for the sake of clarity and understanding of the invention some details of no importance may be deleted from the drawings. Some details may have the same reference number but belong to different examples and shows a generic feature.

Figure 1:
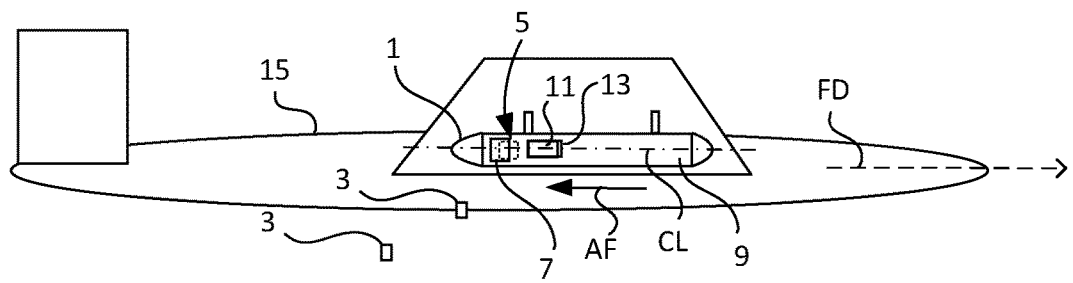
FIG. 1 illustrates an arrangement configured for storing and launching a payload according to a first example.

FIG. 1 illustrates an arrangement 1 configured for storing and launching a payload 3 according to a first example. The arrangement 1 comprises a launch compartment 5 configured to eject the payload 3 from the launch compartment 5 via a push-out chamber 7 to an airflow AF, which during use of the arrangement 1 flows over an aerodynamic surface 9 of the arrangement 1. The aerodynamic surface 9 is provided with an openable hatch member 11 configured to cover an air intake 13 connected to the push-out chamber 7.

The arrangement 1 may be carried by an aerial vehicle 15 and is adapted for sideways ejection of the payload 3.

The air intake 13 may be designed to allow separated flow (not shown) of air into the push-out chamber 7 via an internal duct arrangement (not shown) arranged within the arrangement 1 between the air intake 13 and the push-out chamber 7.

In such way is achieved that, when the arrangement 1 is moved through the air in a flight direction FD and the air flows over the aerodynamic surface 9 as an airflow AF, separated flow of air flowing into the push-out chamber 7 will affect the payload 3 being ejected with an additional push-out force.

By means of wind tunnel experiments made by the applicant it has been shown that the additional push-out force also may flip around the payload 3. Such rotation of the payload 3 is beneficial for releasing a countermeasure element (not shown) from the payload 3 by means of the airflow AF.

Figure 2:
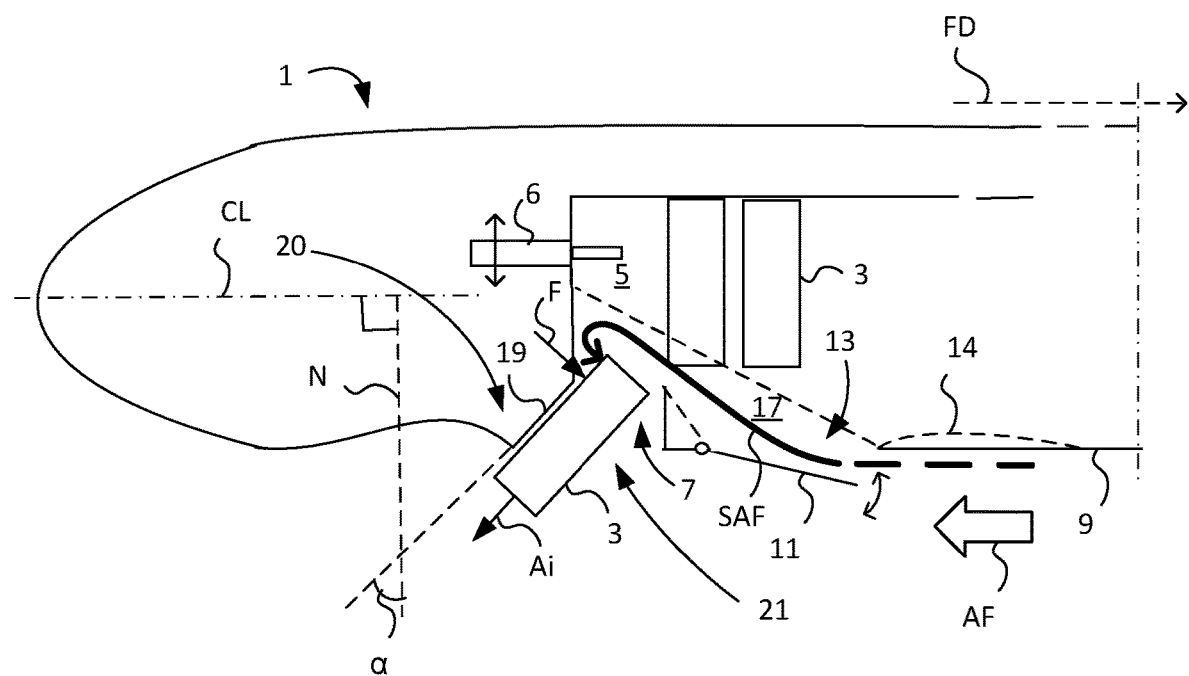
FIG. 2 illustrates an arrangement configured for storing and launching a payload according to a second example.

FIG. 2 illustrates an arrangement 1 configured for storing and launching a payload 3 according to a second example. The arrangement 1 comprises a launch compartment 5 configured to eject the payload 3 from the launch compartment 5 via a push-out chamber 7 to an airflow AF, which during use of the arrangement 1 flows over an aerodynamic surface 9 of the arrangement 1.

The launch compartment 5 is provided with an ejection mechanism 6 configured to push-out the payload 3. The aerodynamic surface 9 is provided with an openable hatch member 11 configured to cover an air intake 13 connected to the push-out chamber 7. The air intake 13 and the openable hatch member 11 being configured in an open state to, during use of the arrangement 1, lead a separated flow of air SAF divided from the airflow AF into the push-out chamber 7 from the air intake 13 to the payload 3 via an internal duct arrangement 17. The separated flow of air SAF flowing into the push-out chamber 7 will affect the payload 3, being ejected by means of the ejection mechanism 6, with an additional push-out force F.

The air intake 13 may be designed to allow the separated flow of air SAF into the push-out chamber 7 via the internal duct arrangement 17 provided between the air intake 13 and the push-out chamber 7.

The internal duct arrangement 17 may be configured to redirect the separated flow of air SAF in a direction opposite or any suitable direction for affecting the payload 3 with the additional push-out force F.

The ejection mechanism 6 is configured to eject the payload 3 along a guideway 19 extending from the launch compartment to a launch opening 21 via the push-out chamber 7, which guideway 19 may entirely be inclined relative the flight direction or partly inclined.

The launch opening 21 is provided in the aerodynamic surface 9 and is coupled or associated with the launch compartment 5 via the push-out chamber 7 for providing an open connection between the launch compartment 5 and the airflow AF.

The arrangement 1 may comprise an air intake 13 formed as a submerged 14 air inlet (broken line as an example) comprising curved walls recessed into the aerodynamic surface so that the air intake 13 and/or the openable hatch member 11 will operate as a low-drag air inlet.

A sliding portion of the payload may be configured, during launching, to be able to slide along the guideway 19 extending within the push-out chamber 7 from the launch compartment 5 to the launch opening 21.

The extension of the guideway 19 may extend a distance outward from and beyond the aerodynamic surface by means of a protruding ramp 20.

The extension of the guideway 19 may incline with an acute angle α relative the normal N to the centre line CL of the arrangement 1.

The acute angle α may be between 10° to 60°, preferably between 20° and 45°.

The acute angle α may be determined in such a way that, during use of the arrangement 1, airflow AF flowing over the aerodynamic surface 9 will apply an additional impetus Ai on a first portion of the payload 3 being ejected, so that the payload 3 will flip around for releasing a countermeasure element (not shown) by means of the airflow, which countermeasure element is arranged to the payload 3.

Figure 3:
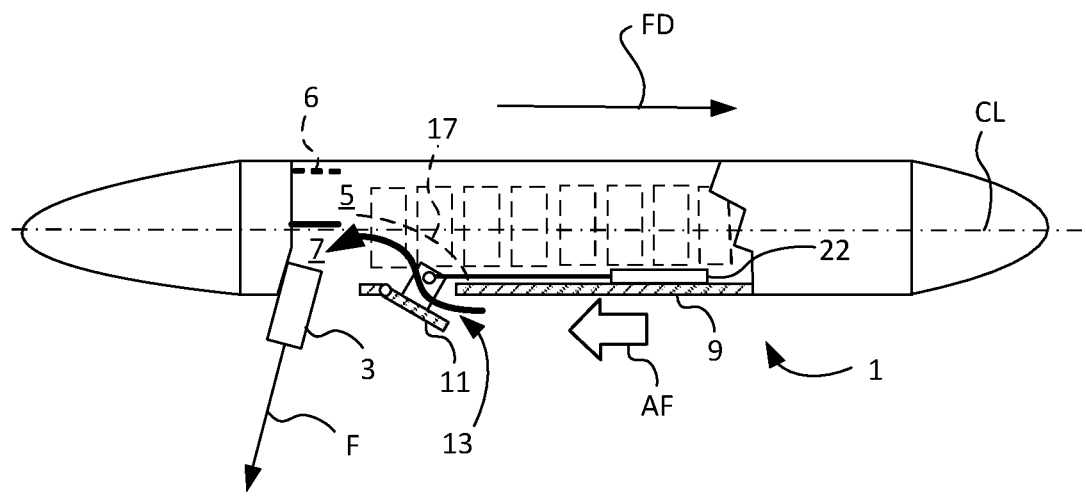
FIG. 3 illustrates an arrangement configured for storing and launching a payload according to a third example.

FIG. 3 illustrates an arrangement 1 configured for storing and launching a payload 3 according to a third example. The arrangement 1 comprises a launch compartment 5 configured with an eject mechanism 6 configured to eject the payload 3 from the launch compartment 5 via a push-out chamber 7 to an airflow AF, which during use of the arrangement 1 flows over an aerodynamic surface 9 of the arrangement 1. The aerodynamic surface 9 is provided with an openable hatch member 11 configured to cover an air intake 13 coupled to the push-out chamber 7 and/or launch compartment 5 via an internal air transfer arrangement 17.

The openable hatch member 11 may be operated by a drive unit 22, which in turn is coupled to a control unit (not shown) configured to operate the openable hatch member 11 in a variable manner for affecting the payload 3 with a proper additional push-out force F depending upon the attitude and the velocity of the aerial vehicle (not shown) carrying the arrangement 1.

In such way is achieved that, when the arrangement 1 is moved through the air in a flight direction FD, and the air flows over the aerodynamic surface 9 as an airflow AF, the flow of air flowing into the push-out chamber 7 and/or launch compartment 5, will affect the payload 3 (being ejected) with an additional push-out force F. In such way the eject force produced by the eject mechanism 6 can be added with an additional push-out force F. In such way is provided that a rapid sideway ejection of the payload 3 can be achieved.

The arrangement is moved through the air along a flight direction, wherein the air flows over the aerodynamic surface as an airflow AF. The payload 3 being ejected will be affected by an additional force generated by the airflow AF providing that a rapid sideway ejection of the payload 3 is achieved. A direction pointing from the fore end to the aft end fully or essentially corresponds with the direction of an airflow AF flowing over the aerodynamic surface.

An imaginary inclining line of the guideway defines the inclination of the guideway, wherein the inclining line inclines toward the aft end AE and thus inclines "with" the airflow AF. The airflow AF will apply an additional force on the payload being ejected, which additional force assists and supports the ejection of the payload further sideways. In such way the ejected payload will be affected by an additional force F generated by the airflow AF providing that a rapid sideway ejection of the payload is achieved.

Figure 4:
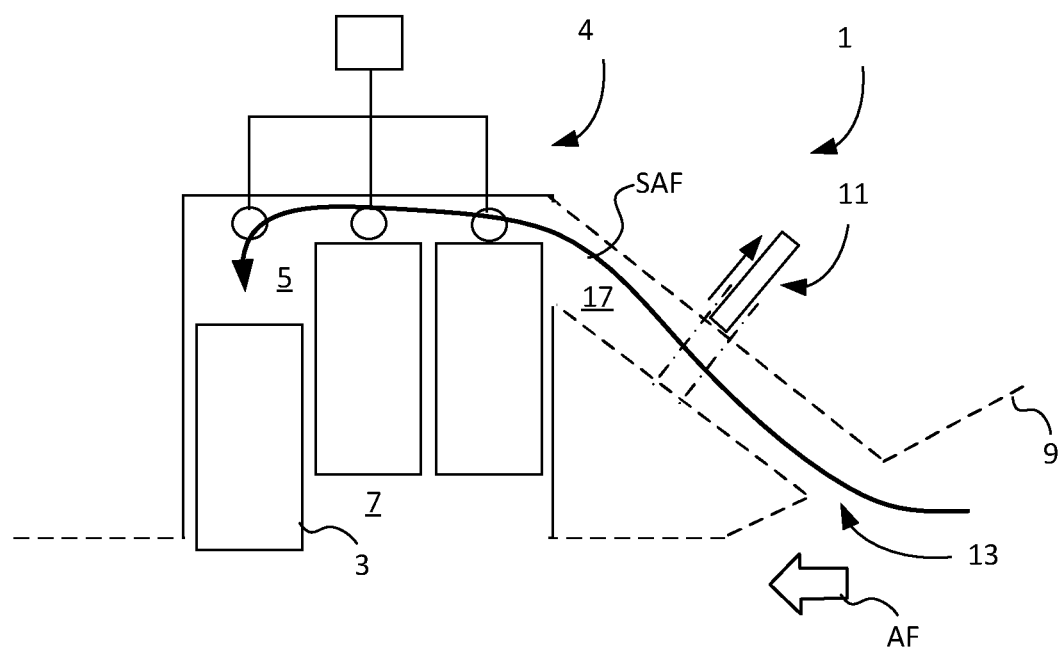
FIG. 4 illustrates an arrangement configured for storing and launching a payload according to a fourth example.

FIG. 4 illustrates an arrangement 1 configured for storing and launching a payload 3. The arrangement comprises a launch compartment 5 configured to eject the payload 3 from the launch compartment 5 by means of an electro-pyrotechnical ejection device 4. The payload 3 is ejected to an airflow AF, which during use of the arrangement 1 flows over an aerodynamic surface 9 of the arrangement 1. The payload 3 is ejected via a push-out chamber 7, which is integrally arranged with the launch compartment 5. An air intake 13 is formed in the aerodynamic surface 9 and is coupled to the launch compartment 5 via an internal air duct 17 comprising an openable closure member 11 configured to close the internal air duct 17. The air intake 13 and the openable closure member 11 may be configured to, in an open state and during use of the arrangement, lead a separated flow of air SAF divided from the airflow AF into the launch compartment 5 via the internal air duct 17. In such way is achieved that the payload 3 will be affected by an additional push-out force which is applied in a direction outward from the arrangement 1.

Figure 5:
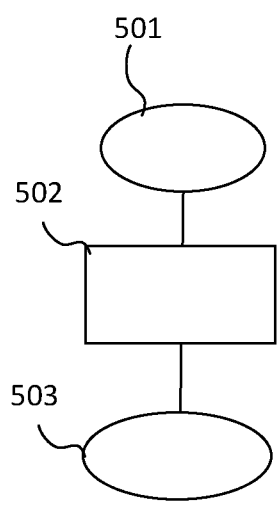
FIG. 5 illustrates a flowchart showing an exemplary method for launching a payload.

FIG. 5 illustrates a flowchart showing an exemplary method for launching a payload of an arrangement 1 configured to eject the payload from the launch compartment via a push-out chamber to an airflow, which during use of the arrangement flows over an aerodynamic surface of the arrangement, wherein an air intake is formed in the aerodynamic surface and is coupled to the push-out chamber and/or launch compartment via an internal air transfer arrangement comprising an openable closure member configured to close the internal air transfer arrangement. The method starts with step 501. In a second step 502 the method is performed. In a third step 503 the method is stopped. The step 502 may comprise the steps of; loading the launch compartment with the payload; opening the openable closure member for dividing a separated flow of air from the airflow and leading the separated flow of air into the push-out chamber and/or launch compartment from the air intake; ejecting at least one payload from the launch compartment; and closing the openable hatch member.

Figure 6:
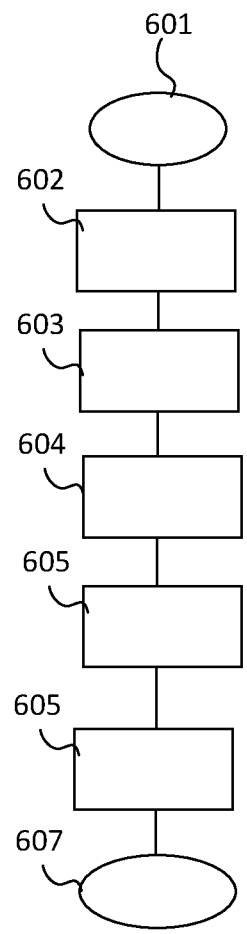
FIG. 6 illustrates a flowchart showing an exemplary method for launching a payload.

FIG. 6 illustrates a further example of a method for launching the payload from an arrangement 1 as defined in FIG. 5. The exemplary method starts with step 601. A second step 602 comprises loading the launch compartment with the payload. A third step 603 comprises the step opening the openable closure member for dividing a separated flow of air from the airflow. A fourth step 604 comprises leading the separated flow of air into the push-out chamber and/or launch compartment from the air intake and leading the separated flow of air into the push-out chamber and/or launch compartment in such way that the separated flow of air (SAF) is directed in a direction opposite or nearly opposite the direction of the airflow (AF) and/or is directed in a direction that inclines obliquely downwards and forwards relative to the flight direction. A fifth step 605 comprises ejecting at least one payload from the launch compartment. A sixth step 606 comprises closing the openable closure member. In a seventh step 607 the method is stopped.

The present invention is of course not in any way restricted to the examples described above, but many possibilities to modifications, or combinations of the examples, thereof should be apparent to a person with ordinary skill in the art without departing from the basic idea of the invention as defined in the appended claims.

The invention claimed is:

1. A side-ways ejection arrangement (1) configured for storing and launching a payload (3), comprising:
    a payload (3) stored and launched by the arrangement (1),
    a push-out chamber (7),
    a launch compartment (5) comprising an ejection device (4) configured to eject the payload (3) from the launch compartment (5) via the push-out chamber (7) to an airflow (AF) that, during use of the arrangement (1), flows over an aerodynamic surface (9) of the arrangement (1), and
    an air intake (13) formed in the aerodynamic surface (9) and coupled to the launch compartment (5) via an internal air transfer arrangement (17) comprising an openable closure member (11) configured to close and open the internal air transfer arrangement (17), wherein:

the air intake (13) is configured to transfer flow of air to the launch compartment (5) via the internal air transfer arrangement (17) such that the flow of air flowing into the launch compartment (5) will affect the payload (3) being ejected with an additional push-out force, and an eject force of the ejection device (4) is added with said additional push-out force.

2. The arrangement (1) according to claim 1, wherein at least one of the air intake (13) or the openable closure member (11) configured to, in an open state and during use of the arrangement (1), lead a separated flow of air (SAF) divided from the airflow (AF) into the launch compartment (5) via the internal air transfer arrangement (17).

3. The arrangement (1) according to claim 1, wherein at least one of the air intake (13) or the openable closure member (11) is configured to form a low-drag air inlet.

4. The arrangement (1) according to claim 1, wherein the air intake (13) is configured to allow a separated flow of air (SAF) into the launch compartment (5) via an internal duct arrangement provided between the air intake (13) and the launch compartment (5).

5. The arrangement (1) according to claim 1, wherein the internal air transfer arrangement (17) is configured to direct a separated flow of air (SAF) at least one of: in a direction opposite or nearly opposite the direction of the airflow (AF), or in a direction inclining obliquely downwards and forwards relative to the flight direction (FD).

6. The arrangement (1) according to claim 1, wherein a sliding portion of the payload (3) is configured, during launching, to be able to slide along a guideway (19) extending within the push-out chamber (7) from the launch compartment (5) to a launch opening (21).

7. The arrangement (1) according to claim 6, wherein the extension of the guideway (19) extends a distance outward from and beyond the aerodynamic surface (9)e by means of a protruding ramp (20).

8. The arrangement (1) according to claim 6, wherein the extension of the guideway (19) inclines with an acute angle (α) relative the normal (N) to the centre line (CL) of the arrangement (1).

9. An aerial vehicle (15) configured to carry the arrangement (1) of claim 1.

10. A method for launching a payload (3) by means of a side-ways ejection-arrangement (1) that comprises an ejection device (4) configured to eject the payload (3) from a launch compartment (5) via a push-out chamber (7) to an airflow (AF), which during use of the arrangement (1) flows over an aerodynamic surface (9) of the arrangement (1), wherein an air intake (13) is formed in the aerodynamic surface (9) and is coupled to the launch compartment (5) via an internal air transfer arrangement (17) comprising an openable closure member (11) configured to close and open the internal air transfer arrangement (17), the method comprises the steps of:

loading the launch compartment (5) with the payload (3) to be launched;

opening the openable closure member (11) for dividing a separated flow of air (SAF) from the airflow (AF) and leading the separated flow of air (SAF) into the launch compartment (5) from the air intake (13), the air intake (13) is configured to transfer flow of air to the launch compartment (5) via an internal air transfer arrangement (17), wherein the flow of air flowing into the launch compartment (5) will affect the payload (3) being ejected with an additional push-out force, and wherein an elect force of the ejection device (4) is added with said additional push-out force;

ejecting the payload (3) from the launch compartment (5); and closing the openable hatch member (11).

11. The method according to claim 10, wherein the method comprises the further step of:

leading the separated flow of air (SAF) into the launch compartment (5) in such way that the separated flow of air (SAF) is directed in a direction opposite or nearly opposite the direction of the airflow (AF) and/or is directed in a direction that inclines obliquely downwards and forwards relative to the flight direction (FD).

* * * * *

UNITED STATES PATENT AND TRADEMARK OFFICE
CERTIFICATE OF CORRECTION

| | | |
|---|---|---|
| PATENT NO. | : 11,919,641 B2 | Page 1 of 1 |
| APPLICATION NO. | : 17/257949 | |
| DATED | : March 5, 2024 | |
| INVENTOR(S) | : Gunnar Bystroem | |

It is certified that error appears in the above-identified patent and that said Letters Patent is hereby corrected as shown below:

In the Claims

In Column 9, Line 16, Claim 2, delete "(11) configured" and insert -- (11) is configured --, therefor.

In Column 9, Line 41, Claim 7, delete "(9)e" and insert -- (9) --, therefor.

Signed and Sealed this
Twenty-fifth Day of June, 2024

Katherine Kelly Vidal
*Director of the United States Patent and Trademark Office*